United States Patent
Lindoff et al.

(10) Patent No.: US 8,055,252 B2
(45) Date of Patent: Nov. 8, 2011

(54) ADAPTIVE CELL ID DETECTION IN A CELLULAR COMMUNICATIONS SYSTEM

(75) Inventors: Bengt Lindoff, Bjärred (SE); Robert Baldemair, Solna (SE); Erik Dahlman, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 922 days.

(21) Appl. No.: 11/952,216

(22) Filed: Dec. 7, 2007

(65) Prior Publication Data

US 2008/0167029 A1 Jul. 10, 2008

Related U.S. Application Data

(60) Provisional application No. 60/883,900, filed on Jan. 8, 2007.

(51) Int. Cl.
*H04W 4/00* (2009.01)
(52) U.S. Cl. ............ 455/422.1; 455/425; 370/335; 370/342; 370/527
(58) Field of Classification Search .......... 370/335, 370/342, 527; 455/425
See application file for complete search history.

(56) References Cited

U.S. PATENT DOCUMENTS

| | | | |
|---|---|---|---|
| 5,722,070 A * | 2/1998 | Alford | 455/425 |
| 2003/0174686 A1 * | 9/2003 | Willenegger et al. | 370/342 |
| 2004/0246998 A1 * | 12/2004 | Ma et al. | 370/527 |
| 2005/0111522 A1 | 5/2005 | Sung et al. | |
| 2006/0035654 A1 | 2/2006 | Lee et al. | |
| 2006/0078040 A1 | 4/2006 | Sung et al. | |
| 2006/0140156 A1 * | 6/2006 | Hayashi et al. | 370/335 |
| 2008/0101488 A1 | 5/2008 | Wilhelmsson et al. | |

FOREIGN PATENT DOCUMENTS

| | | |
|---|---|---|
| EP | 1 467 508 A1 | 10/2004 |
| EP | 1 675 340 A1 | 6/2006 |
| EP | 1 681 821 A2 | 7/2006 |
| WO | 2005/041448 A1 | 5/2005 |
| WO | 2006/062308 A1 | 6/2006 |

OTHER PUBLICATIONS

"Outcome of cell search drafting session" Document R1-062990. 3GPP TSG-RAN WG1 #46bis, Oct. 9-13, 2006, Seoul, Korea.
"Way Forward for Secondary SCH Mapping and Scrambling", Document R1-074498. 3GPP TSG RAN WG1 #50bis, Oct. 8-12, 2007, Shanghai, China.

(Continued)

*Primary Examiner* — Lester Kincaid
*Assistant Examiner* — Isaak R Jama
(74) *Attorney, Agent, or Firm* — Potomac Patent Group PLLC

(57) ABSTRACT

A cell identifier is indicated in a signal to be transmitted in a cellular communication system by selecting one of a number, M, of codes, wherein each of the codes has a length N of code symbols, and wherein the selected code is associated with the cell identifier. The selected code is transmitted as a number, N, of reference symbols. The M codes are orthogonal with one another over their length, N, of the code symbols and also over at least one subgroup of length L of the code symbols, wherein L<M. During cell search, whether to use all N reference symbols or one or more subgroups of the reference symbols to construct one of M possible orthogonal codes depends on what type of cell search is being performed.

16 Claims, 6 Drawing Sheets

OTHER PUBLICATIONS

PCT International Search Report, mailed Apr. 21, 2008, in connection with International Application No. PCT/EP2007/064378.
PCT Written Opinion, mailed Apr. 21, 2008, in connection with International Application No. PCT/EP2007/064378.
Lingyan, Cai et al.: "Cell search and frequency synchronization for beyond 3G" Emerging Technologies: Frontiers of Mobile and Wireless Communication, May 31, 2004-Jun. 2, 2004, pp. 45-48, IEEE, Piscataway, NJ, USA, XP010716009, ISBN: 0-7803-7938-1.

* cited by examiner

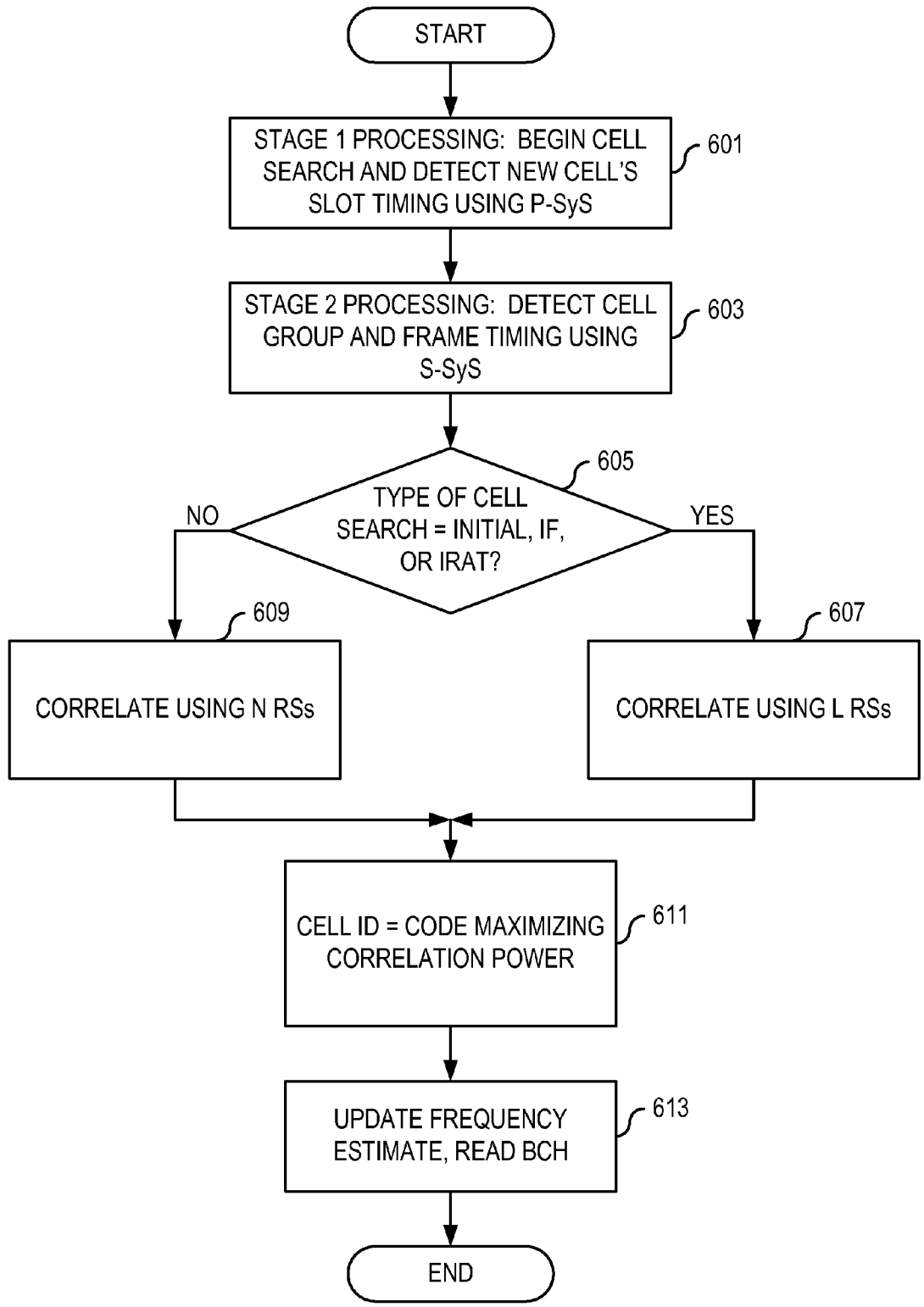

ADAPTIVE CELL ID DETECTION IN A CELLULAR COMMUNICATIONS SYSTEM

CROSS REFERENCE TO RELATED APPLICATIONS

This application claims the benefit of U.S. Provisional Application No. 60/883,900, filed Jan. 8, 2007, which is hereby incorporated herein by reference in its entirety.

BACKGROUND

The present invention relates to methods and apparatuses for identifying cells in a cellular communication system.

In the forthcoming evolution of the mobile cellular standards like the Global System for Mobile Communication (GSM) and Wideband Code Division Multiple Access (WCDMA), new transmission techniques like Orthogonal Frequency Division Multiplexing (OFDM) are likely to occur. Furthermore, in order to have a smooth migration from the existing cellular systems to the new high capacity high data rate system in existing radio spectrum, a new system has to be able to utilize a bandwidth of varying size. A proposal for such a new flexible cellular system, called Third Generation Long Term Evolution (3G LTE), can be seen as an evolution of the 3G WCDMA standard. This system will use OFDM as the multiple access technique (called OFDMA) in the downlink and will be able to operate on bandwidths ranging from 1.25 MHz to 20 MHz. Furthermore, data rates up to 100 Mb/s will be supported for the largest bandwidth. However, it is expected that 3G LTE will be used not only for high rate services, but also for low rate services like voice. Since 3G LTE is designed for Transmission Control Protocol/Internet Protocol (TCP/IP), Voice over IP (VoIP) will likely be the service that carries speech.

The physical layer of a 3G LTE system includes a generic radio frame having a duration of 10 ms. FIG. 1 illustrates one such frame 100. Each frame has 20 slots (numbered 0 through 19), each slot having a duration of 0.5 ms. A sub-frame is made up of two adjacent slots, and therefore has a duration of 1 ms.

One important aspect of LTE is the mobility function. Hence, synchronization symbols and cell search procedures are of major importance in order for the User Equipment (UE) to detect and synchronize with other cells. To facilitate cell search and synchronization procedures, defined signals include primary and secondary synchronization signals (P-SyS and S-SyS, respectively), which are transmitted on a Primary Synchronization Channel (P-SCH) and a Secondary Synchronization Channel (S-SCH), respectively. The P-SySs and S-SySs are each broadcast twice per frame: once in sub-frame 0, and again in sub-frame 5, as shown in FIG. 1.

The currently proposed cell search scheme for LTE is as follows:

1. Detect one out of three possible P-SyS symbols, thereby indicating the 5 ms timing and the cell ID within a currently unknown cell group.

2. Detect frame timing and cell group using the S-SyS. This in combination with the results from step 1 gives an indication of the full cell ID.

3. Use the reference symbols (also called CQI pilots) to verify the cell ID. The interested reader is referred to the document R1-062990, entitled "Outcome of cell search drafting session", TSG-RAN WG1 #46bis, Oct. 9-13, 2006 for more information about this proposal.

4. Read the Broadcast Channel (BCH) to receive cell-specific system information.

The first two steps are well known in the art and are similar to the cell search scheme presently used in WCDMA systems. The third step is also used in WCDMA, where the pilot signal (CPICH) is scrambled with a pseudorandom noise sequence (pn-sequence) that determines the cell ID. By assuming the channel that affects the CPICH over a certain interval (one or two slots in WCDMA) is constant, one can detect the scrambling sequence easily.

The idea in LTE is also to scramble the reference symbols, both with a pn-sequence to discriminate between cells in different cell groups and also with an orthogonal sequence on reference symbols (RSs), the orthogonality being within the cell group. However, unlike WCDMA, LTE does not have strong continuous pilot channels, but instead relies on fewer RSs. These RSs are placed in the first and third from last OFDM symbols in each slot, and are placed on every sixth carrier, hence a distance of 90 kHz between the pilots. This is illustrated in FIG. 2, which depicts the proposed pilot (reference signal) pattern in the frequency (f) and time (t) dimension of a slot for the LTE system. In the figure, the first reference symbols are denoted "$R_1$"; the second reference symbols are denoted "$R_2$"; and data are denoted "D".

A fundamental problem with using pilot symbols that are transmitted on different sub-carriers for scrambling code identification is that the phases for the different sub-carriers are typically affected in different and unknown ways from one another. This means that, unlike in WCDMA systems in which the channel is constant over the one or two slots and hence no phase equalization is needed to perform cell ID detection, in LTE systems coherent alignment of the pilots without equalization is not feasible, making the code detection procedure much harder in an LTE system than in earlier known systems. Some examples of how delay-spread and sampling error affect the channel for different sub-carriers are described in U.S. patent application Ser. No. 11/762,382 to Wilhelmsson and Lindoff entitled "Robust and Low-Complexity Combined Signal Power Estimation" and filed on Jun. 13, 2007.

Furthermore, in order to have coherence gain, the RSs used for cell ID detection will be spread out over a relative long time scale (1 ms) making the cell ID detection also sensitive to frequency errors.

Consequently, there is a need for cell ID detection algorithms that that are capable of performing well under the above-described circumstances.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in a methods and apparatuses that indicate a cell identifier in a signal to be transmitted in a cellular communication system. Making the indication includes selecting one of a plurality, M, of codes, wherein each of the codes has a length N of code symbols, and wherein the selected code is associated with the cell identifier. The selected code is transmitted as a plurality, N, of reference symbols. The M codes are orthogonal with one another over their length, N, of the code symbols and also over at least one subgroup of length L of the code symbols, wherein L<N.

In some embodiments, the reference symbols are distributed in a time-frequency domain grid.

In some embodiments, a physical layer of the cellular communication system employs Orthogonal Frequency Division Multiplexing.

In some embodiments, N=6, and each of the M codes, R, is a two-dimensional orthogonal sequence distributed over frequencies and time, and is specified by:

$$R = \begin{pmatrix} R_{0,1} & R_{0,2} \\ R_{1,1} & R_{1,2} \\ R_{2,1} & R_{2,2} \end{pmatrix} = \left[ \begin{pmatrix} 1 & 1 \\ 1 & 1 \\ 1 & 1 \end{pmatrix}, \begin{pmatrix} 1 & y \\ x & 1 \\ y & x \end{pmatrix}, \begin{pmatrix} 1 & x \\ y & 1 \\ x & y \end{pmatrix} \right],$$

where $$x = e^{j2\pi/3}$$

and $$y = e^{j4\pi/3}.$$

In accordance with another aspect of the invention, the foregoing and other aspects are achieved in methods and apparatuses that detect a cell identifier in a received signal that was transmitted in a cellular communication system, wherein the signal includes a plurality, N, of reference symbols that together represent one of M orthogonal codes, wherein each of the codes has a length N of code symbols. Such detection includes determining whether a cell search procedure to be performed is of a first type. If the cell search procedure to be performed is of the first type, then a constructed code is generated from a first number of the reference symbols, wherein the constructed code generated from the first number of the reference symbols represents one of M orthogonal codes. However, if the cell search procedure to be performed is not of the first type, then the constructed code is generated from a second number of the reference symbols, wherein the constructed code generated from the second number of the reference symbols represents one of M orthogonal codes. The constructed code is correlated against a plurality of known codes to detect the cell identifier. In such embodiments, at least one of the first number of the reference symbols and the second number of the reference symbols is a subgroup of length L of the reference symbols, wherein L<N; and the M codes are orthogonal with one another over their length, N, of the code symbols, are orthogonal with one another over the first number of code symbols, and also are orthogonal over one another over the second number of code symbols.

In some embodiments, one of the first number of reference symbols and the second number of reference symbols are N reference symbols.

In some embodiments, one of the first number of reference symbols and the second number of reference symbols is a number, $L_1$, that is less than N, and an other one of the first number of reference symbols and the second number of reference symbols is a number, $L_2$, that is less than N, wherein $L_1 \neq L_2$.

In some embodiments, a physical layer of the cellular communication system employs Orthogonal Frequency Division Multiplexing.

In some embodiments, determining whether the cell search procedure to be performed is of the first type comprises determining whether the cell search procedure to be performed is included in a group comprising initial cell search, inter-frequency cell search and intra-frequency cell search.

In some embodiments, N=6, and each of the M codes, R, is a two-dimensional orthogonal sequence distributed over frequencies and time, and is specified by:

$$R = \begin{pmatrix} R_{0,1} & R_{0,2} \\ R_{1,1} & R_{1,2} \\ R_{2,1} & R_{2,2} \end{pmatrix} = \left[ \begin{pmatrix} 1 & 1 \\ 1 & 1 \\ 1 & 1 \end{pmatrix}, \begin{pmatrix} 1 & y \\ x & 1 \\ y & x \end{pmatrix}, \begin{pmatrix} 1 & x \\ y & 1 \\ x & y \end{pmatrix} \right],$$

where $$x = e^{j2\pi/3}$$

and $$y = e^{j4\pi/3}.$$

BRIEF DESCRIPTION OF THE DRAWINGS

The objects and advantages of the invention will be understood by reading the following detailed description in conjunction with the drawings in which:

FIG. 6 is a flow chart of exemplary processes/steps performed by circuitry in a UE for utilizing the inventive adaptable code allocation (in accordance with principles described above) for cell ID determination in accordance with other embodiments consistent with the invention.

DETAILED DESCRIPTION

Figure 1:
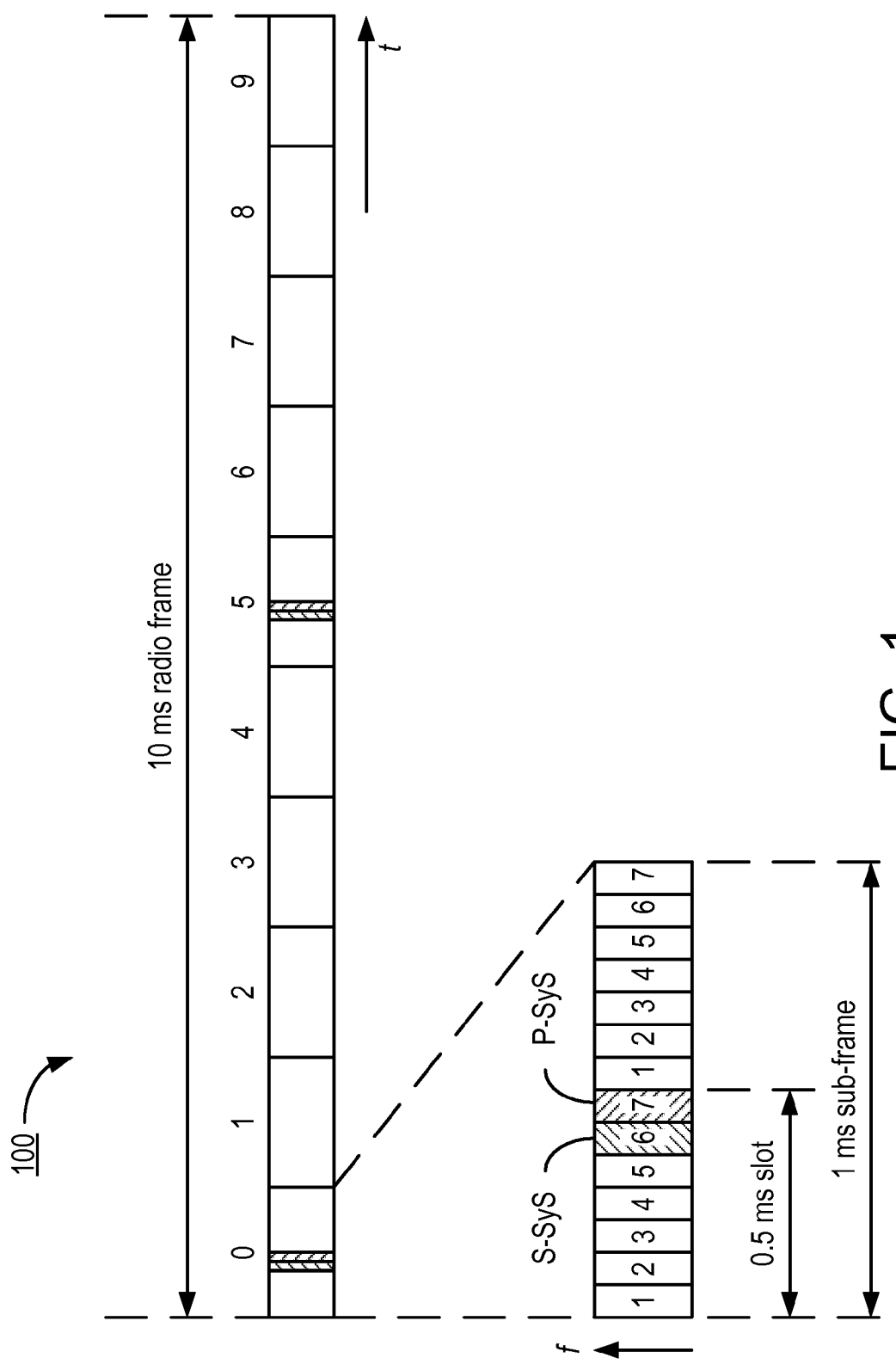
FIG. 1 is an exemplary radio frame suitable for communications systems like the 3G LTE system.
Figure 2:
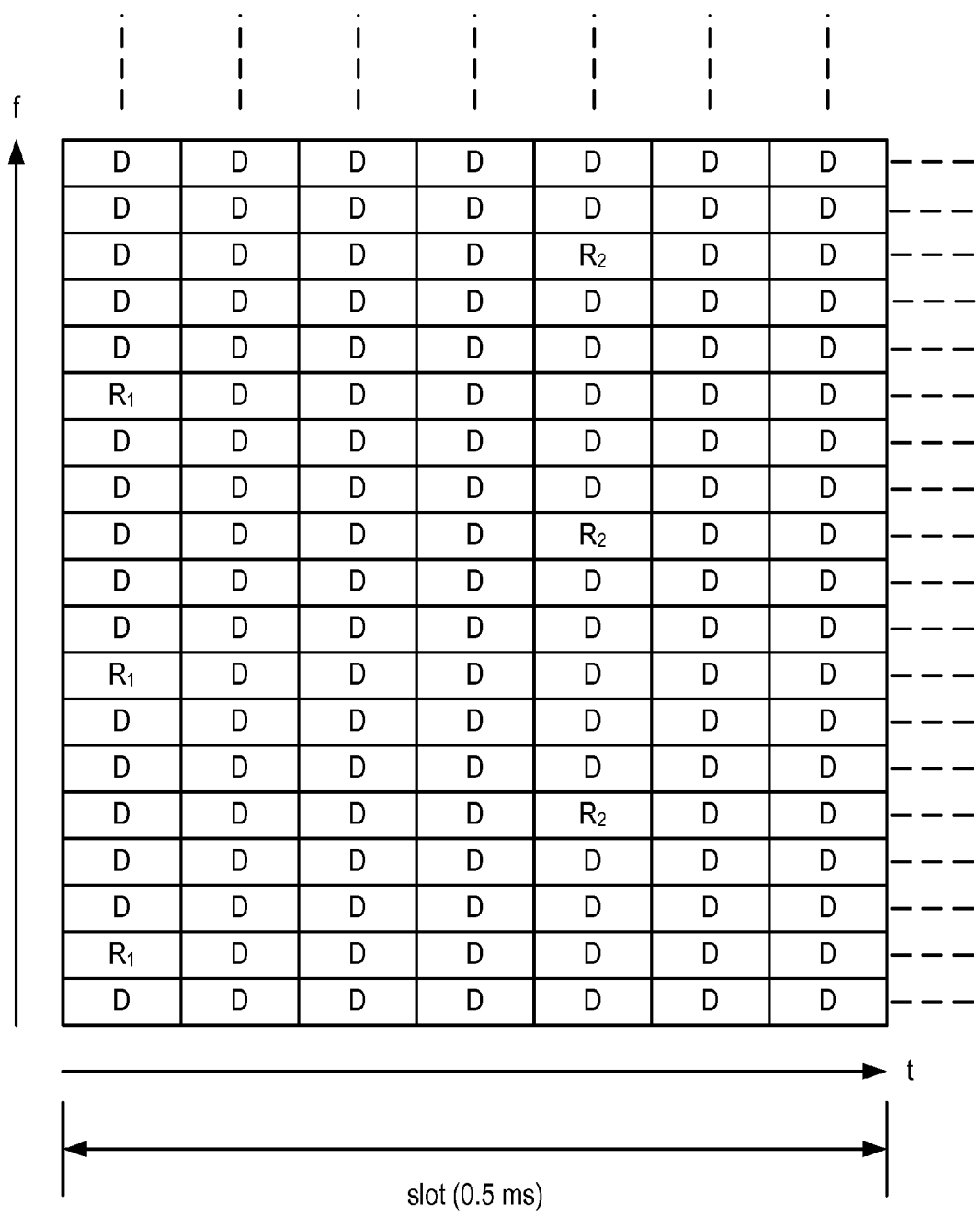
FIG. 2 depicts the proposed pilot (reference signal) pattern in the frequency and time domain for the LTE system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

An aspect of embodiments consistent with the invention is the inclusion of a cell ID detection algorithm that is capable of adapting the detection strategy to the current cell search scenario (e.g., initial cell search having large frequency errors, neighboring cell search with requirements to find new cells quickly, etc.).

Various embodiments achieve this by adapting the number of reference symbols (RSs) that are used for cell ID detection such that optimized detection performance is achieved. For example, when there is a large frequency error, the terminal (e.g., UE) is caused to use only a specific subgroup of the RSs allocated to cell ID detection, wherein the subgroup is robust to frequency error. In this way, the cell ID detection is also made more robust to frequency error (i.e., resistant to loss of orthogonality in the presence of a frequency error).

As another example, the subgroup corresponding to RSs in one Synchronization Channel (SCH) TTI can be used in Inter-frequency Inter-Radio Access Technology (IRAT) cell search scenarios, in which the measurement gap is too small to do detection over both SCH TTIs within the 10 ms superframe.

In another aspect, the subgroup should be chosen such that the code specific characteristics (for example, orthogonality if orthogonal codes) are maintained.

These and other aspects are described in greater detail in the following.

Figure 3:
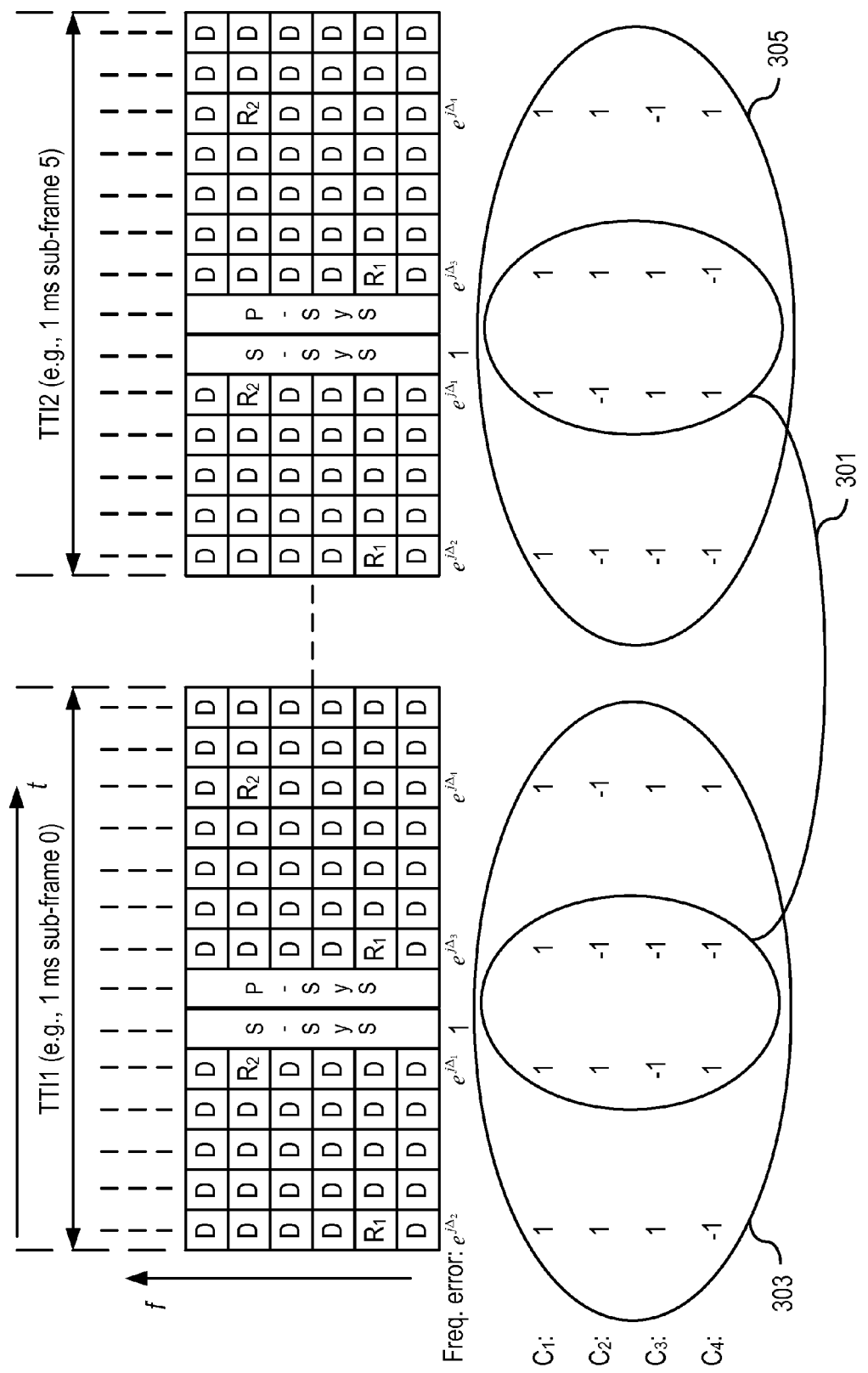
FIG. 3 is a diagram depicting an exemplary orthogonal code allocation that is useful for performing cell ID detection under various circumstances.

FIG. 3 is a diagram depicting an exemplary orthogonal code allocation that is useful for performing cell ID detection under various circumstances. This simple example is used to facilitate a description of various aspects of the invention. The invention is not limited to this particular code allocation.

In this case N=8 RSs are used for cell ID identification. The 8 RSs are evenly distributed over two Transmission Time Intervals (TTIs), which, for example can be the first and fifth subframes of an LTE radio frame, as shown. Each RS (either $R_1$ or $R_2$) contributes 1 bit to an 8-bit code. In this example, it is assumed that the number of codes required to distinguish between different cells is M=2, 3 or 4. In FIG. 3, four codes are illustrated, labeled $C_1$, $C_2$, $C_3$, and $C_4$, each code being 8-bits long. The exemplary codes are characterized by including three orthogonal subgroups (each of length L=4) 301, 303, 305.

A typical stage 3 cell ID identification procedure requires that there be a phase reference. Such a phase reference can be obtained by, for example, using the P-SyS and S-SyS symbols which, by the time stage 3 processing is reached, are known. Hence a rough channel estimate can be obtained and the channel responses can be (and are) equalized over the TTI using the channel estimate obtained from the SySs. This equalization does not, however, compensate for frequency error.

The various subgroups 301, 303, 305 can be advantageously used in the following ways. In some scenarios (e.g., at the time of initial cell search) the frequency error can be quite high (>500 Hz) and hence the channel estimate, obtained in the middle of the TTI (i.e., where the SCHs are located), will be quite erroneous at the beginning and end parts of the TTIs. In general, the channel estimates will be phase shifted by an amount herein denoted $e^{j\Delta_i}$, whose value depends on the distance (in time) from the SCHs upon which the channel estimate was based. But, since the frequency error is typically constant over two adjacent SCH TTIs, the relative frequency error is the same in each of the SCH TTIs. Hence, one can reduce the effects of channel estimation error by using only the two RSs closest to the SCHs in each TTI for cell ID detection (i.e., subgroup 301); this comes, however, at the price of using fewer RSs (i.e., four instead of eight) to do cell ID detection. Hence, when large frequency errors are expected, the orthogonal subgroup 301 should be used for cell ID detection.

In other scenarios, such as inter-frequency cell search, in which the UE is interrupting the reception and performs a cell search on other carrier frequencies, the UE may only have the possibility of performing detection over one TTI, since the permitted interruption time might be smaller than 5 ms (i.e., the distance between TTI1 and TTI2). In this case, the cell ID needs to be detected over only one SCH TTI. To do this, orthogonality needs to be maintained over the RS TTI subgroup. Use of either of the subgroups 303 and 305 satisfies this requirement.

In those instances in which K*8 RSs are used (K>1) for cell ID determinations and the placement of the RSs is repeated in a similar fashion in the frequency-time grid, the 8 RSs orthogonal codes can be repeated over the K RS groups.

Figure 4:
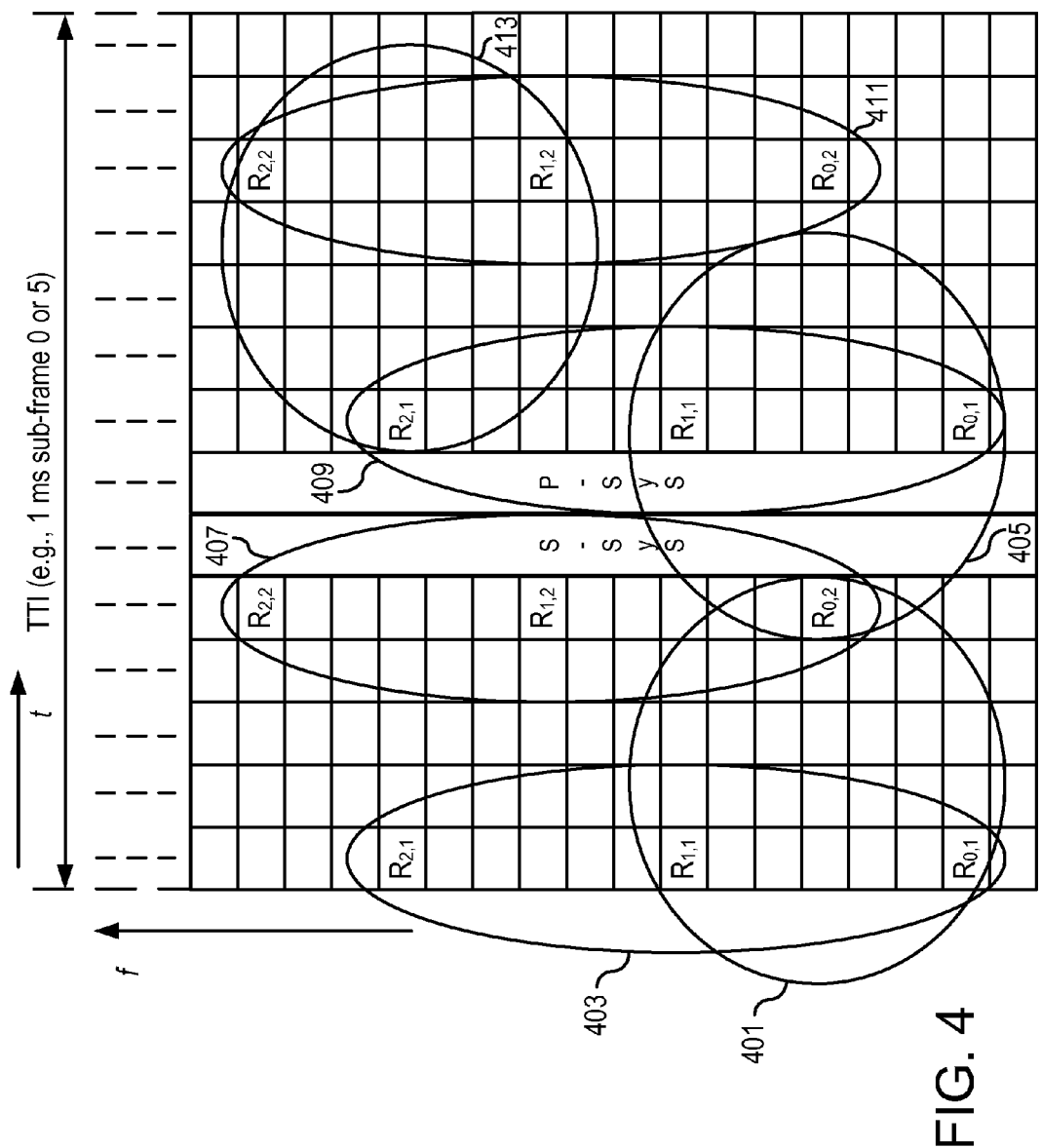
FIG. 4 illustrates another exemplary orthogonal code having orthogonal subgroups that permits cell ID detection to be performed based either on the entire code or on any of the subgroups.

FIG. 4 illustrates another exemplary orthogonal code having orthogonal subgroups that permits cell ID detection to be performed based either on the entire code or on any of the subgroups. In this example, which is suitable for use as a code allocation in the LTE system, R is a two-dimensional (i.e., distributed over frequencies and in time) orthogonal sequence of length 6, and is specified by:

$$R = \begin{pmatrix} R_{0,1} & R_{0,2} \\ R_{1,1} & R_{1,2} \\ R_{2,1} & R_{2,2} \end{pmatrix} = \left[ \begin{pmatrix} 1 & 1 \\ 1 & 1 \\ 1 & 1 \end{pmatrix}, \begin{pmatrix} 1 & y \\ x & 1 \\ y & x \end{pmatrix}, \begin{pmatrix} 1 & x \\ y & 1 \\ x & y \end{pmatrix} \right],$$

where $$x = e^{j2\pi/3}$$

and $$y = e^{j4\pi/3}.$$

The illustrated sequence is contained in a single TTI (e.g., subframe 0 or subframe 5 in an LTE system). As before, orthogonality between four different codes is maintained over the entire sequence as well over a number of subgroups 401, 403, 405, 407, 409, 411, 413 that are variously spaced nearer to or farther from the SCH from which a channel estimate is obtained. Which subgroup to choose is depends on the context in which the cell search is to be performed. For example, for an initial cell search, with a potentially larger frequency offset, subgroups 407 and 409 (which are close to the P-SyS and S-SyS) would minimize the effects of the frequency offset and would therefore be a good choice. By comparison, it would be preferable to use subgroups 403, 411, 407, and 409 when a neighbor cell search is to be performed.

Figure 5:
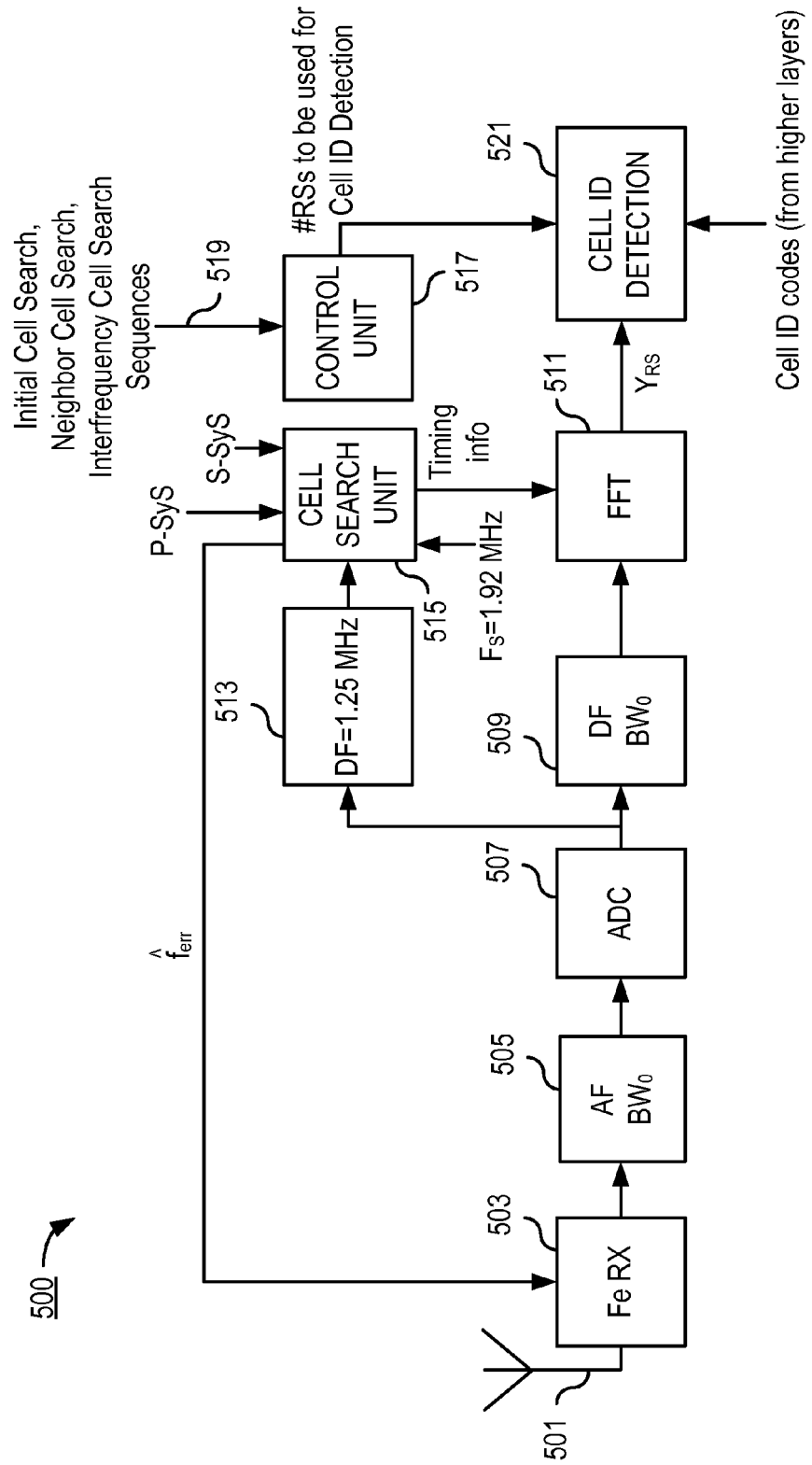
FIG. 5 is a block diagram of an exemplary terminal 500 (i.e., a UE) that utilizes the adaptable code allocation for cell ID identification.

FIG. 5 is a block diagram of an exemplary terminal 500 (i.e., a UE) that utilizes an adaptable code allocation (in accordance with principles described above) for cell ID identification. When engaged in a cell search procedure, an Orthogonal Frequency Division Multiplexing (OFDM) signal is provided by an antenna 501 to a front end receiver (Fe RX) 503 that receives and down-converts the signal into a baseband signal. The bandwidth (BW) of interest in the baseband signal is extracted by an analog filter (AF) 505, and is converted into a digital signal by an analog-to-digital converter (ADC) 507. The digital signal is then filtered by a digital filter (DF) 509, which filters noise introduced by the analog-to-digital converter 507 and also removes adjacent channel interferers not completely removed by the analog filter 505. The signal provided at the output of the digital filter 509 is then processed by a Fast Fourier Transform (FFT) 511 to extract the reference symbols, $Y_{RS}$.

The digital signal supplied by the ADC 507 is also fed to a narrower digital filter 513 that extracts the bandwidth associated with the SCH (here, for the sake of example, assumed to be 1.25 MHz, which is the assumed bandwidth of the SCH in an LTE system). The filtered signal from the digital filter 513 is fed to a cell search unit 515 that performs the cell search P-SyS and S-SyS detection (i.e., correlating the received signal against the set of known P-SyS and S-SyS signals to determine cell group, etc.). In this exemplary embodiment, the cell search unit 515 looks for the P-SyS and S-SyS at a frequency $F_S$=1.92 MHz. The invention, however, is not limited to this example. The cell search unit 515 generates timing information that is supplied to the FFT 511.

The terminal 500 further includes a control unit 517 that receives information 519 about what kind of cell search is to be performed (e.g., initial cell search, intra-frequency neighbor (NB) cell search, or inter-frequency cell search). From this information 519 it decides how many and which RSs (subgroups) will be used for cell ID detection. An indication of the decided number and grouping of RSs to be used for cell ID detection are supplied by the control unit 517 to a cell ID detection unit 521 that correlates the subset of sub-carriers corresponding to the reference symbols, $Y_{RS}$, against the M orthogonal codes, the length and selection of symbols being decided by the control unit 517.

FIG. 6 is a flow chart of exemplary processes/steps performed by circuitry in a UE for utilizing the inventive adaptable code allocation (in accordance with principles described above) for cell ID determination in accordance with other embodiments consistent with the invention. The various blocks shown in FIG. 6 can also be considered to represent the UE's logic configured to perform the indicated function.

The UE begins by performing stage 1 processing, which includes beginning the cell search and detecting a newly found cell's slot timing (e.g., 5 ms timing) and an indication of the cell ID within a currently unknown cell group using the signals received on the P-SCH (step 601). Techniques for performing this step are well-known, and beyond the scope of the invention.

The UE then performs stage 2 processing (step 603), which as discussed earlier, involves detection of cell group and frame timing using the S-SyS using known techniques.

The UE is now ready to perform stage 3 processing. However, in accordance with an aspect of embodiments consistent with the invention, the type of cell search being performed will determine the length and composition of the orthogonal codes that will be used for cell ID detection. More particularly, there are a number of different types of cell searches (e.g., initial cell search, neighbor cell search, inter-frequency cell search, and inter-radio access technology cell search), and each performs stage 2 processing to detect frame timing and to identify a cell's cell group. The cell search procedures are essentially the same for the different types, but there are some differences. For example, for an intra-frequency cell search the UE can perform cell searching simultaneously with data reception from the serving cell. However, for inter-frequency or inter-radio access technology cell searches (e.g., camping on a GSM system and performing cell search on an LTE system carrier) the UE must interrupt its data reception from the serving cell when changing carrier frequencies for the cell search. In order to reduce the interruption length (i.e., interruption in data reception), one wants to be able to detect all cell information in one synchronization frame. This eliminates the possibility of accumulating cell search information over a number of synchronization frames and therefore results in inter-frequency and inter-radio access technology cell searches having worse performance than intra-frequency cell searches. To accommodate this, networks are typically planned to tolerate slower cell searching for the inter-frequency and inter-radio access technology cell searching than for intra-frequency cell searching.

As to initial cell search procedures, the frequency error can be large. This creates a need to perform a frequency error correction step, typically between stages 1 and 2. Initial cell search performance is typically not as good as that of neighbor cell searching, but initial cell search is performed only when the UE is turned on, so it does not seriously affect the UE's overall performance.

Returning now to a discussion of FIG. 6, if it is determined that the type of cell search being performed is of a first type, such as an initial, inter-frequency ("IF") or inter-radio access technology (IRAT) cell search ("YES" path out of decision block 605), stage 3 processing is invoked that uses only sub-group, L, out of N possible RSs (L<N) to construct one of the orthogonal codes (step 607).

However, if it is determined that the type of cell search being performed is not of the first type (e.g., not any of an initial, inter-frequency or inter-radio access technology cell search) ("NO" path out of decision block 605), this means that the UE is performing a type of cell search that requires more accurate performance. Consequently, stage 3 processing is invoked that uses all N of the RSs to construct one of the orthogonal codes for use in the cell detection procedure (step 609).

The code constructed from either step 305 or step 307 is then used in the usual way to detect the cell ID. That is, the cell ID is taken as that code (either short or maximum length, depending on the type of cell search being performed) that maximizes correlation power (step 611).

The frequency estimate is then updated (using automatic frequency control techniques that are known) and the Broadcast Channel (BCH) is read (step 613). Each of these procedures is well-known, and need not be described here in detail.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way.

For example, the exemplary embodiment illustrated by FIG. 6 showed actions being based on whether the type of cell search was a first type or a second type. However, other embodiments might distinguish between more than two types of cell search procedures, and use different length codes for each of the more than two types of cell search procedures. For example, alternative embodiments can be devised in which initial cell searches use a first number, $L_1$, RS's ($L_1$<N); inter-frequency and inter-radio access technology cell searches use a second number, $L_2$, RSs ($L_2$<N); and intrafrequency (i.e., neighbor) cell searches use all N RS's.

The scope of the invention is given by the appended claims, rather than the preceding description, and all variations and equivalents which fall within the range of the claims are intended to be embraced therein.

What is claimed is.

1. A method of indicating a cell identifier in a signal to be transmitted in a cellular communication system, the method comprising.

selecting one of a plurality, M, of codes, wherein each of the codes has a length N of code symbols, and wherein the selected code is associated with the cell identifier; and transmitting the selected code as a plurality, N, of reference symbols, wherein the M codes are orthogonal with one another over their length, N, of the code symbols and also over at least one subgroup of length L of the code symbols, wherein L<N, wherein:

N=6;

each of the M codes, R, is a two-dimensional orthogonal sequence distributed over frequencies and time, and is specified by:

$$R = \begin{pmatrix} R_{0,1} & R_{0,2} \\ R_{1,1} & R_{1,2} \\ R_{2,1} & R_{2,2} \end{pmatrix} = \left[ \begin{pmatrix} 1 & 1 \\ 1 & 1 \\ 1 & 1 \end{pmatrix}, \begin{pmatrix} 1 & y \\ x & 1 \\ y & x \end{pmatrix}, \begin{pmatrix} 1 & x \\ y & 1 \\ x & y \end{pmatrix} \right],$$

where $x = e^{j2\pi/3}$ and $y = e^{j4\pi/3}$.

2. The method of claim 1, wherein a physical layer of the cellular communication system employs Orthogonal Frequency Division Multiplexing.

3. A method of detecting a cell identifier in a received signal that was transmitted in a cellular communication system, wherein the signal includes a plurality, N, of reference symbols that together represent one of M orthogonal codes, wherein each of the codes has a length N of code symbols, the method comprising:

determining whether a cell search procedure to be performed is of a first type;

if the cell search procedure to be performed is of the first type, then generating a constructed code from a first number of the reference symbols, wherein the constructed code generated from the first number of the reference symbols represents one of M orthogonal codes;

if the cell search procedure to be performed is not of the first type, then generating the constructed code from a second number of the reference symbols, wherein the constructed code generated from the second number of the reference symbols represents one of M orthogonal codes; and correlating the constructed code against a plurality of known codes to detect the cell identifier, wherein:

at least one of the first number of the reference symbols and the second number of the reference symbols is a subgroup of length L of the reference symbols, wherein L<N; and the M codes are orthogonal with one another over their length, N, of code symbols, are orthogonal with one another over the first number of code symbols, and also are orthogonal over one another over the second number of code symbols.

4. The method of claim 3, wherein one of the first number of reference symbols and the second number of reference symbols are N reference symbols.

5. The method of claim 3, wherein one of the first number of reference symbols and the second number of reference symbols is a number, $L_1$, that is less than N, and an other one of the first number of reference symbols and the second number of reference symbols is a number, $L_2$, that is less than N, wherein $L_1 \neq L_2$.

6. The method of claim 3, wherein a physical layer of the cellular communication system employs Orthogonal Frequency Division Multiplexing.

7. The method of claim 3, wherein determining whether the cell search procedure to be performed is of the first type comprises:

determining whether the cell search procedure to be performed is included in a group comprising initial cell search, inter-frequency cell search and intra-frequency cell search.

8. The method of claim 3, wherein:

N=6;

each of the M codes, R, is a two-dimensional orthogonal sequence distributed over frequencies and time, and is specified by:

$$R = \begin{pmatrix} R_{0,1} & R_{0,2} \\ R_{1,1} & R_{1,2} \\ R_{2,1} & R_{2,2} \end{pmatrix} = \left[ \begin{pmatrix} 1 & 1 \\ 1 & 1 \\ 1 & 1 \end{pmatrix}, \begin{pmatrix} 1 & y \\ x & 1 \\ y & x \end{pmatrix}, \begin{pmatrix} 1 & x \\ y & 1 \\ x & y \end{pmatrix} \right],$$

where $x = e^{j2\pi/3}$ and $y = e^{j4\pi/3}$.

9. An apparatus for indicating a cell identifier in a signal to be transmitted in a cellular communication system, the apparatus comprising:

logic configured to select one of a plurality, M, of codes, wherein each of the codes has a length N of code symbols, and wherein the selected code is associated with the cell identifier; and logic configured to transmit the selected code as a plurality, N, of reference symbols, wherein the M codes are orthogonal with one another over their length, N, of the code symbols and also over at least one subgroup of length L of the code symbols, wherein L<N, wherein:

N=6;

each of the M codes, R, is a two-dimensional orthogonal sequence distributed over frequencies and time, and is specified by:

$$R = \begin{pmatrix} R_{0,1} & R_{0,2} \\ R_{1,1} & R_{1,2} \\ R_{2,1} & R_{2,2} \end{pmatrix} = \left[ \begin{pmatrix} 1 & 1 \\ 1 & 1 \\ 1 & 1 \end{pmatrix}, \begin{pmatrix} 1 & y \\ x & 1 \\ y & x \end{pmatrix}, \begin{pmatrix} 1 & x \\ y & 1 \\ x & y \end{pmatrix} \right],$$

where $x = e^{j2\pi/3}$ and $y = e^{j4\pi/3}$.

10. The apparatus of claim 9, wherein a physical layer of the cellular communication system employs Orthogonal Frequency Division Multiplexing.

11. An apparatus for detecting a cell identifier in a received signal that was transmitted in a cellular communication system, wherein the signal includes a plurality, N, of reference symbols that together represent one of M orthogonal codes, wherein each of the codes has a length N of code symbols, the apparatus comprising:

logic configured to determine whether a cell search procedure to be performed is of a first type;

logic configured respond to the cell search procedure to be performed being of the first type by generating a constructed code from a first number of the reference symbols, wherein the constructed code generated from the first number of the reference symbols represents one of M orthogonal codes;

logic configured to respond to the cell search procedure to be performed not being of the first type by generating a constructed code from a second number of the reference symbols, wherein the constructed code generated from the second number of the reference symbols represents one of M orthogonal codes; and logic configured to correlate the constructed code against a plurality of known codes to detect the cell identifier, wherein:

at least one of the first number of the reference symbols and the second number of the reference symbols is a subgroup of length L of the reference symbols, wherein L<N; and the M codes are orthogonal with one another over their length, N, of code symbols, are orthogonal with one another over the first number of code symbols, and also are orthogonal over one another over the second number of code symbols.

12. The apparatus of claim 11, wherein one of the first number of reference symbols and the second number of reference symbols are N reference symbols.

13. The apparatus of claim 11, wherein one of the first number of reference symbols and the second number of reference symbols is a number, $L_1$, that is less than N, and an other one of the first number of reference symbols and the second number of reference symbols is a number, $L_2$, that is less than N, wherein $L_1 \neq L_2$.

14. The apparatus of claim 11, wherein a physical layer of the cellular communication system employs Orthogonal Frequency Division Multiplexing.

15. The apparatus of claim 11, wherein the logic configured to determine whether the cell search procedure to be performed is of the first type comprises.

logic configured to determine whether the cell search procedure to be performed is included in a group comprising initial cell search, inter-frequency cell search and intra-frequency cell search.

16. The apparatus of claim 11, wherein:

N=6;

each of the M codes, R, is a two-dimensional orthogonal sequence distributed over frequencies and time, and is specified by:

$$R = \begin{pmatrix} R_{0,1} & R_{0,2} \\ R_{1,1} & R_{1,2} \\ R_{2,1} & R_{2,2} \end{pmatrix} = \left[ \begin{pmatrix} 1 & 1 \\ 1 & 1 \\ 1 & 1 \end{pmatrix}, \begin{pmatrix} 1 & y \\ x & 1 \\ y & x \end{pmatrix}, \begin{pmatrix} 1 & x \\ y & 1 \\ x & y \end{pmatrix} \right],$$

where $x = e^{j2\pi/3}$ and $y = e^{j4\pi/3}$.

* * * * *

UNITED STATES PATENT AND TRADEMARK OFFICE
CERTIFICATE OF CORRECTION

PATENT NO.         : 8,055,252 B2                                          Page 1 of 1
APPLICATION NO.    : 11/952216
DATED              : November 8, 2011
INVENTOR(S)        : Lindoff et al.

It is certified that error appears in the above-identified patent and that said Letters Patent is hereby corrected as shown below:

In Column 8, Line 67, in Claim 1, delete "comprising." and insert -- comprising: --, therefor.

In Column 9, Line 36, in Claim 3, delete "comprising." and insert -- comprising: --, therefor.

In Column 12, Line 11, in Claim 15, delete "comprises." and insert -- comprises: --, therefor.

Signed and Sealed this
Fifteenth Day of May, 2012

David J. Kappos
*Director of the United States Patent and Trademark Office*